US012640056B2

(12) United States Patent
Williams

(10) Patent No.: US 12,640,056 B2
(45) Date of Patent: May 26, 2026

(54) HIGH FIDELITY MOULAGE TASK TRAINER SIMULATION WOUND

(71) Applicant: Rhys Joseph Williams, Greenback, TN (US)

(72) Inventor: Rhys Joseph Williams, Greenback, TN (US)

( * ) Notice: Subject to any disclaimer, the term of this patent is extended or adjusted under 35 U.S.C. 154(b) by 386 days.

(21) Appl. No.: 18/322,188

(22) Filed: May 23, 2023

(65) Prior Publication Data

US 2023/0377486 A1 Nov. 23, 2023

Related U.S. Application Data

(60) Provisional application No. 63/344,856, filed on May 23, 2022.

(51) Int. Cl.
*G09B 23/30* (2006.01)
(52) U.S. Cl.
CPC .................................... *G09B 23/30* (2013.01)
(58) Field of Classification Search
CPC ....... G09B 23/28; G09B 23/30; G09B 23/303
See application file for complete search history.

(56) References Cited

U.S. PATENT DOCUMENTS

| | | | | |
|---|---|---|---|---|
| 8,491,309 B2 * | 7/2013 | Parry | .................... | G09B 23/30 |
| | | | | 434/272 |
| 9,280,917 B2 * | 3/2016 | Parry, Jr | ................ | G09B 9/003 |
| 10,629,084 B2 * | 4/2020 | Blankenship | .......... | G09B 23/30 |
| 10,803,761 B2 * | 10/2020 | Welch | .................... | G06T 19/006 |
| 10,818,201 B2 * | 10/2020 | Hofstetter | .............. | G09B 23/34 |
| 11,195,435 B2 * | 12/2021 | Parry | .................... | G09B 23/303 |
| 11,600,200 B2 * | 3/2023 | Hare | .................... | A41D 13/129 |
| 11,631,343 B2 * | 4/2023 | Parry | .................... | G09B 23/32 |
| | | | | 434/271 |
| 11,776,429 B2 | 10/2023 | Williams | | |
| 11,854,427 B2 * | 12/2023 | Segall | .................. | G09B 23/303 |
| 11,955,030 B2 * | 4/2024 | Taylor | .................. | G09B 23/303 |
| 2018/0158373 A1 * | 6/2018 | Hendrickson | .......... | G09B 23/36 |
| 2021/0082318 A1 * | 3/2021 | Segall | .................. | G09B 23/303 |
| 2023/0105460 A1 | 4/2023 | Williams | | |
| 2023/0154356 A1 | 5/2023 | Williams | | |

* cited by examiner

*Primary Examiner* — Kurt Fernstrom
(74) *Attorney, Agent, or Firm* — Merchant & Gould P.C.

(57) ABSTRACT

A moulage task trainer simulation wound device provides a plurality of tissue layers having differential densities so as to replicate the dynamics and feedback of a real wound. The simulation wound enables definition of a cavity simulating a puncture wound or the like. Four-way stretch material may be integrated into one or more of the plurality of tissue layers to further enhance the fidelity of the training process. The carrier of the simulation wound provides fixation mechanisms that enable adjustability for attaching the task trainer device on a wide array of body types and anatomical locations of a role-player or mannequin.

11 Claims, 7 Drawing Sheets

12
12
16

20
20A
20
20B
12
38
26

HIGH FIDELITY MOULAGE TASK TRAINER SIMULATION WOUND

CROSS-REFERENCE TO RELATED APPLICATION

This application claims the benefit of priority of U.S. provisional application No. 63/344,856, filed May 23, 2022, the contents of which are herein incorporated by reference.

BACKGROUND OF THE INVENTION

The present invention relates to medical simulation and, more particularly, to a high fidelity moulage task trainer simulation wound.

Medical simulation is a branch of simulation related to education and training in medical fields of various industries. Medical practitioners tasked with providing trauma healthcare services for those suffering from cuts and related wounds, typically initially develop their skills using simulations wound sites. Currently, simulated wounds that are worn by participants or role-players in trauma scenarios, however, do not realistically recreate accurate wound dynamics, making them of limited use in training individuals in trauma medicine.

Specifically, current simulated wounds on the market that may be worn by role-players are built using a mono-density design making them feel unrealistic. The wound tracks included in currently available models do not allow for training using current approved medical practices including wound packing; specifically, limited wound tracks do not enable a realistic blood flow leading to unrealistic and potentially dangerously unrealistic training.

Moreover, the current available systems do not produce accurate wound dynamics and do not give accurate feedback to the student and trainer as well as making the wound only adaptable to specifically sized role players. This lack of anatomical and functional accuracy leads to misconceptions resulting in potential improper care at the point of treatment in a real-life scenario.

As can be seen, there is a need for a system of role-player simulated wounds that enhances realism in trauma training while allowing the widest variety of participants to wear the wounds.

SUMMARY OF THE INVENTION

The present invention reproduces the feel, blood flow and wound dynamics in a far more realistically manner than any product on the market. The integration of realistic wound dynamics through the differential density of simulated tissue, realistic wound tracks and adaptable wound fixation makes these simulated wounds unprecedented in the world.

The present invention recreates the function and dynamics of a real wound by creating an anatomically accurate training model with the variable density of real wounds as well as making the removable adherence to the role player in an anatomically accurate and adaptable way.

The present invention solves these issues in several ways including utilizing differential density of silicone that reproduces a realistic feel and function of a real human body, wherein the molding of the silicone product uses a temporary cavity produced by penetrating objects, replicating the function of undermined tissue planes in the body. The differential of density is critical to the application of standard of care treatments regarding simulated tissue response to pressure and wound packing. Specifically, anatomically accurate shore hardness of arteries, veins and surrounding tissue gives feedback to the end-user with the application of manual pressure and wound packing. Internal organs are simulated within and without the wound track by creating the specific variable shore hardness of the organ, entrapment of air and internal application of fluids to create the desired outward appearance, feel and response to treatment.

The present invention adheres a wound piece to the role-player via sectioned hook and loop, the use of clips and straps and laced or girdle type fixation to ensure that the widest variability of role-players may wear the wounds in a realistic manner.

In one aspect of the present invention, the depth of the wound is created by molding the wound temporary or large wound track created by high velocity penetrating trauma beneath the skin layer creating the outward appearance of the natural lines of the body and injuries with increased depth and realism. This aspect allows for current medical standards of care to be performed on the simulated wound including manual pressure within the wound and various wound-packing techniques.

In another aspect of the present invention, the wound cavity created through this process allows for numerous branching tracks to be created within the wound that are not supplied with simulated blood flow. Essentially this creates wound tracks that are not medically necessary to treat creating an opportunity for inappropriate application of manual pressure and wound packing. This ability to fail to meet treatment standards increases the difficulty of treating the wounds and a superior method of performing outcome-based training and evaluation.

The arrangement and spacing of the hook and loop sections used to secure the simulated wound to the role player are unique and critical to the anatomically accurate placement of the simulated wound. To adapt the simulated wound to the various body habitus, shapes and size, spaced panels of hook and loop are attached to the simulated wound. This innovation allows for maximal stretch while maintaining less stress on hook and loop panels increasing durability while increasing the ability to expand or retract to accommodate various-sized role-players.

Another aspect of this invention is the introduction of four-way stretch material within and integral to the layers of silicone. By integration, it is understood that the four-way stretch material is layered into the liquid silicone and becomes integral to the silicone through the curing process. The four-way stretch material creates vastly superior strength while maintaining to the necessary thinness of the material to allow for easy concealment under clothing and maintaining the anatomically accurate lines of anatomy. The introduction of four-way stretch material allows for maximum strength to areas of the wound that will encounter increased stretch force during treatment by trainees without artificially increasing the thickness or firmness of the simulated tissue.

Another aspect of this invention is the addition of anatomically accurate bones fixated into the wound. These bones are created by rendering 3D images from communicated tomography (CT) images of actual injuries or the digital modification of intact anatomical scans. These 3D images are then printed on a 3D printer, hand modified to display the various layers of the bone, specific fractures, and deformities, and then molded in plastic.

The size of the wound can be modified in proportion to change the wound from standard adult sizing to pediatric sizes.

In one aspect of the present invention, a simulated wound task trainer includes the following: a carrier; a simulated wound disposed along a first surface of the carrier, the simulated wound comprising a skin layer with a discontinuity communicating with a cavity underneath the skin layer, wherein a cross-sectional width of the cavity is at least five times a cross-sectional width of the discontinuity; and a plurality of tissue layers defining a distal boundary of the cavity, wherein each tissue layer of the plurality has a different density.

In another aspect of the present invention, the simulated wound task trainer further includes, wherein the plurality of tissue layers includes a first tissue layer and second tissue layer having a first Shore 00 Hardness Scale ranging from 00 to 30 and a second Shore 00 Hardness Scale ranging from 60 to 90, wherein the skin layer has a Shore 00 Hardness Scale ranging from 10 to 80, wherein said layers are silicone, wherein the skin layer is integrated with a four-way stretch material; further including: an outlet of a conduit disposed within the cavity and fluidly connected to the discontinuity; a mass of silicone having Shore D Hardness ranging from 60 to 90, wherein the mass extends from the cavity and through the discontinuity to resemble a bone; a plurality of hook or loop fastener panels disposed along the first surface; and a plurality of hook or loop fastener panels disposed along a second surface, opposite the first surface; or a girdle connection along a second surface, opposite the first surface; and a third tissue layer adhered to the second tissue layer, wherein the third tissue layer is silicon having a third Shore 00 Hardness Scale ranging from 10 to 80.

In yet another aspect of the present invention, a method of making a moulage wound site task trainer, includes forming a negative mold of the simulated wound and applying a plurality of silicone tissue layers defining a distal boundary of the cavity, wherein each tissue layer of the plurality has a different density.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
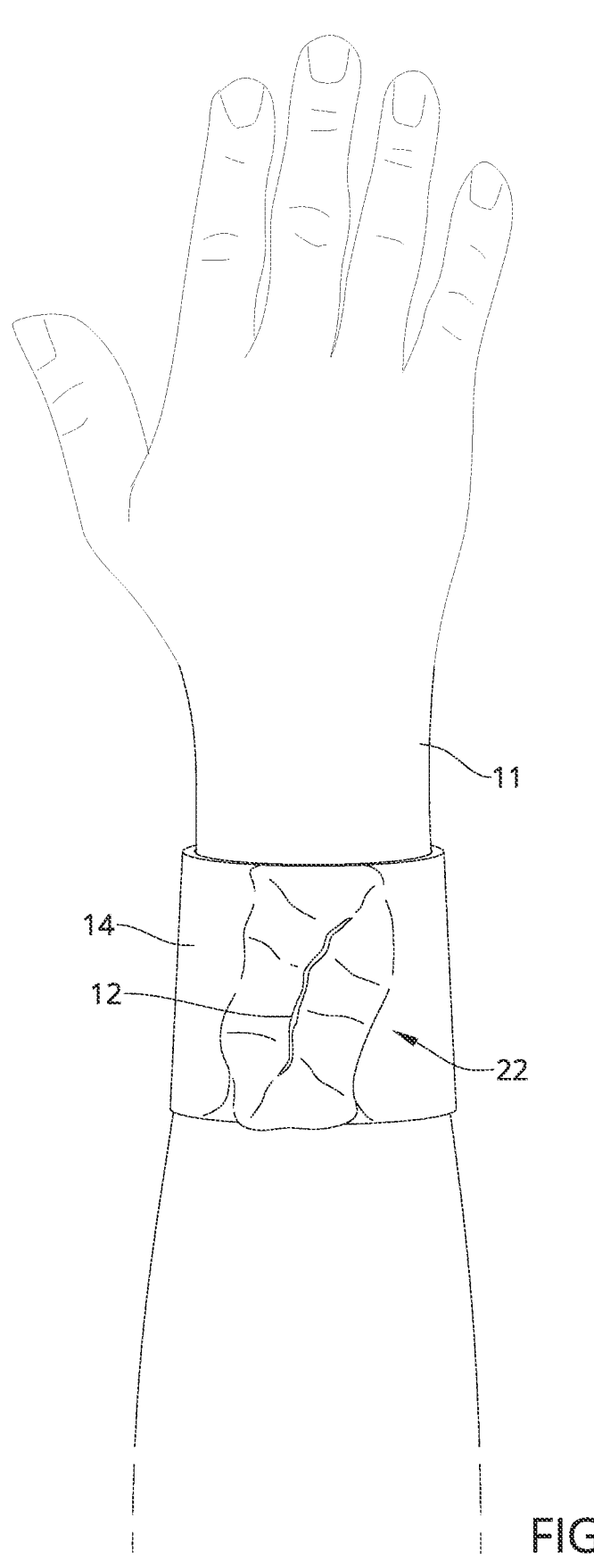
FIG. 1 is a view of an exemplary embodiment of the present invention, shown in use.

Referring to FIG. 1, the present invention may include a wearable wound simulation 10 having a simulated wound 12 disposed along a carrier 14 that is wearable by a user 11.

Figure 2:
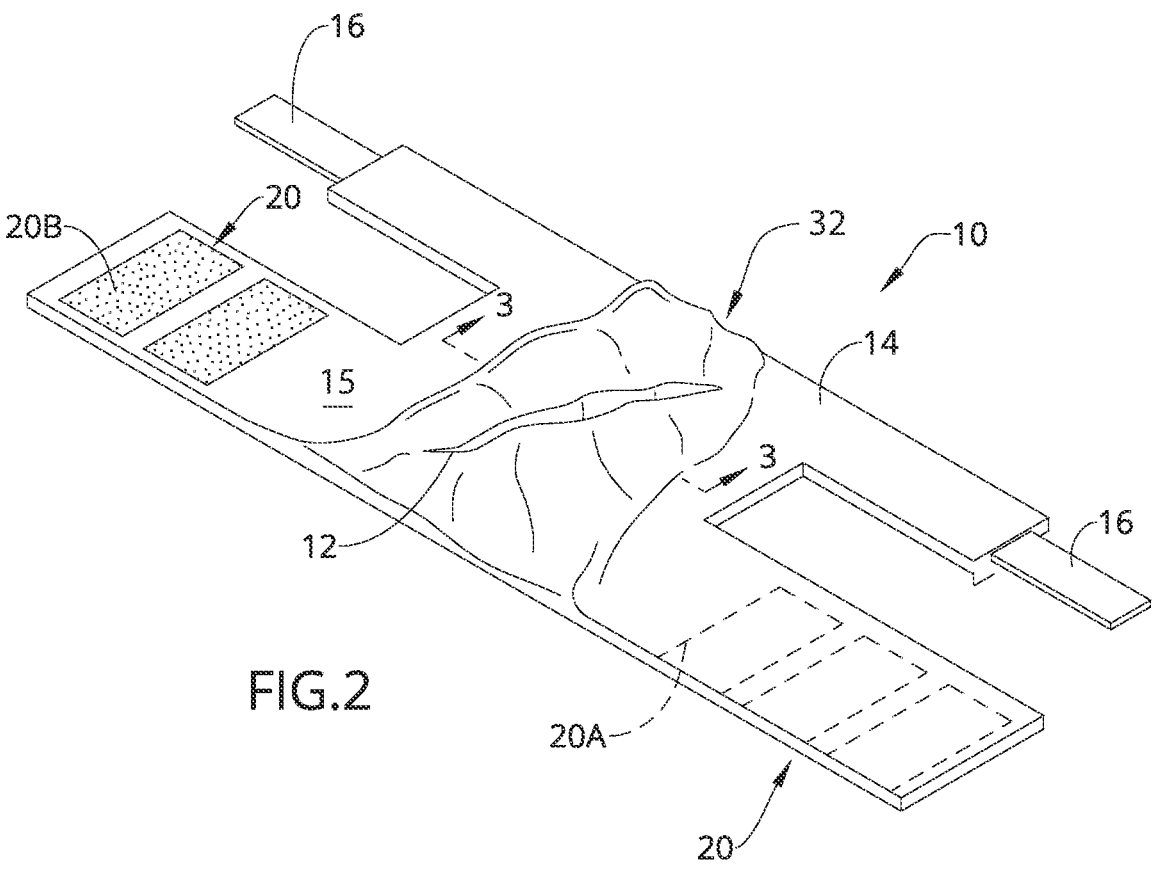
FIG. 2 is a top perspective view of an exemplary embodiment of the present invention.

Referring to FIG. 2, the carrier 14 of the wearable wound simulation 10 may have different shapes, dimensions, and sizes to be adapted to be worn or otherwise engage different parts of human or mannequin anatomy. Along a top surface 15 of the carrier 14, the simulated wound 12 may be provided.

In some embodiments, the carrier is elongated (having a length greater than a width) where opposing ends of said length provides two pair of straps adapted to join to their complementary strap (around the anatomy), wherein a first pair of straps terminates in a complementary connectors 16, and wherein the second pair of straps terminate in a complementary second removably fasteners 20, such as hook 20A and loop 20B material of a hook-and-loop fasteners. It being understood that any removably connectors could be used if they enable an adjustable fitting function.

In some embodiments, the hook and loop fastener 20 may be attached to the silicone by way of a plurality of spaced apart panels with ⅛" to ¼" gaps between hook and loop panels 20A and 20B to allow for maximum stretch allowing for a wide variety of role player size to be accommodated by a single design. Additionally, the hook and loop panel fastener 20 allow for increased durability as less stress is placed on attachment points.

Figure 3:
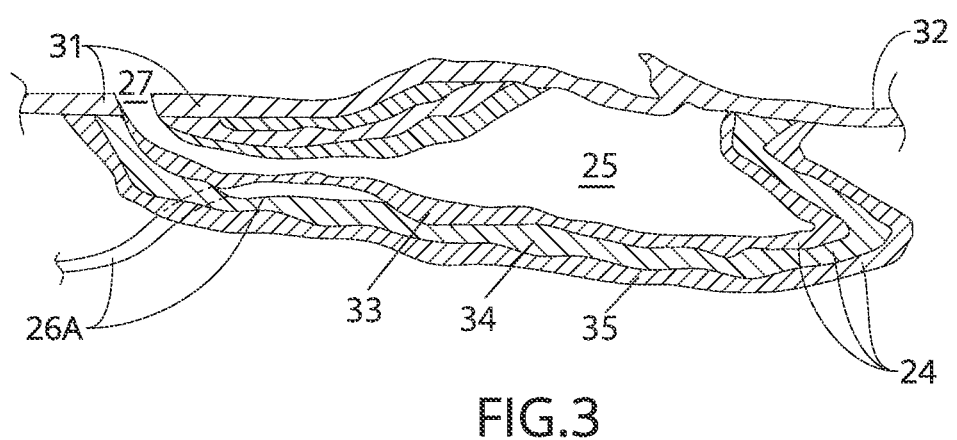
FIG. 3 is a cross-sectional view of an exemplary embodiment of the present invention, taken along line 3-3 in FIG. 2. The wound cavity 25 depth illustrated ranges from ¼ of an inch to eight inches in depth, from the skin layer to the underlying tissue layers 33-35. The corresponding width of the cavity 25 range from at least twice that of the width of the discontinuity 27 (the distance in FIG. 3 between adjacent skin layers 31) to ten inches or more.

Referring to FIG. 3, the simulated wound 12 may introduce a discontinuity in the top surface 15 in the form of a gap or break 27 therein. Such a gap or break 27 is usually associated with a simulated inflamed and/or damaged skin layer 32. This simulated damaged skin layer 32 may include four-way stretch fabric material. The four-way stretch material may be embedded into layers of silicone 24 allowing for maximum strength while allowing silicone thickness to remain as low as ¹⁄₁₆th inch up to approximately five inches.

This is a critical aspect of utilizing lower Shore Hardness silicone which inherently tears much easier that firmer silicones; and as such, the one or more layers of four-way stretch material are embedded into the various layers with differential of density models to increase tear resistance while maintaining realism.

This differential density layered system uses alternating hardness of silicone in layers ranging from Shore 00 10 to Shore D 80 to simulate the varying density of tissue including skin (Shore 00 Scale 10 to 80), subcutaneous (Shore 00 Scale 0 to 30), and connective tissue including tendons and ligaments (Shore 00 Scale 60 to 90), and bones (Shore D Scale 0 to 80). This system is unique in that the layer system creates varied shear pressure of tissues allowing for a realistic tissue feel and response to treatment. A key feature is the response of vital structures like simulated arteries that mimic the shore hardness of human arteries requiring specific pressure to control.

For instance, the damaged skin layer 32 of simulated skin 31 may be integrated or embedded in a differential first density simulated tissue layer 33, a differential second density simulated tissue layer 34, and a differential third density simulated tissue layer 35. Furthermore, the damaged skin layer 32 and the plurality of simulated tissue layers 33, 34, and/or 35 may form an upper surface and a lower surface, respectively, of a temporary cavity 25 as that would be produced by penetrating objects, replicating the function of undermined tissue planes in the body.

Differential of Silicone Density:

Durometer Shore Hardness Scale is an international scale used to address to the hardness of rubbers, semi-rigid plastics, and hard plastics. Shore 00: Hardness Scale measures rubbers and gels that are very soft. Shore A: Hardness Scale measures the hardness of flexible mold rubbers that range in hardness from very soft and flexible, to medium and somewhat flexible, to hard with almost no flexibility at all. Semi-rigid plastics can also be measured on the high end of the Shore A Scale. Shore D: Hardness Scale measures the hardness of hard rubbers, semi-rigid plastics, and hard plastics.

Figure 4:
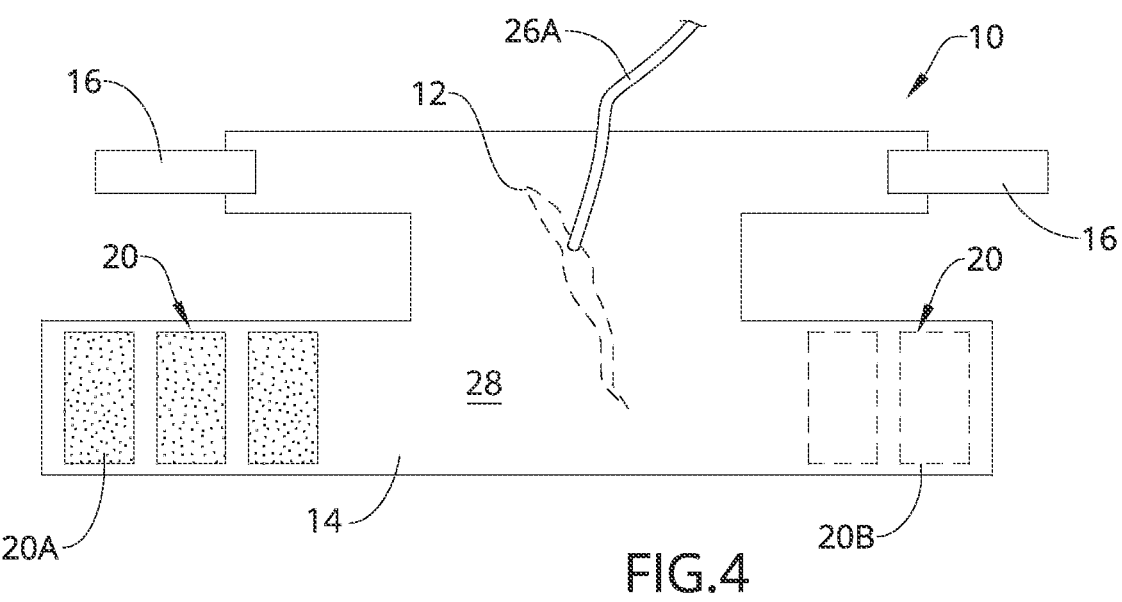
FIG. 4 is a bottom plan view of an exemplary embodiment of the present invention.
Figure 5:
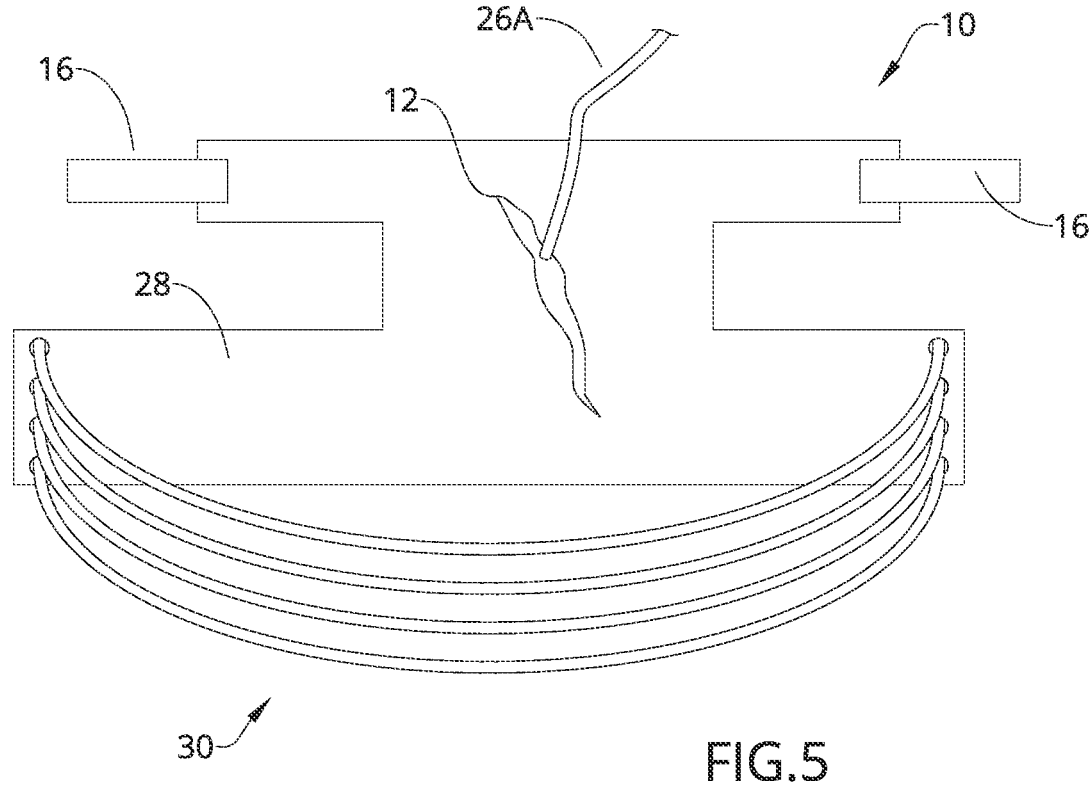
FIG. 5 is a bottom plan view of an exemplary embodiment of the present invention.
Figure 6:
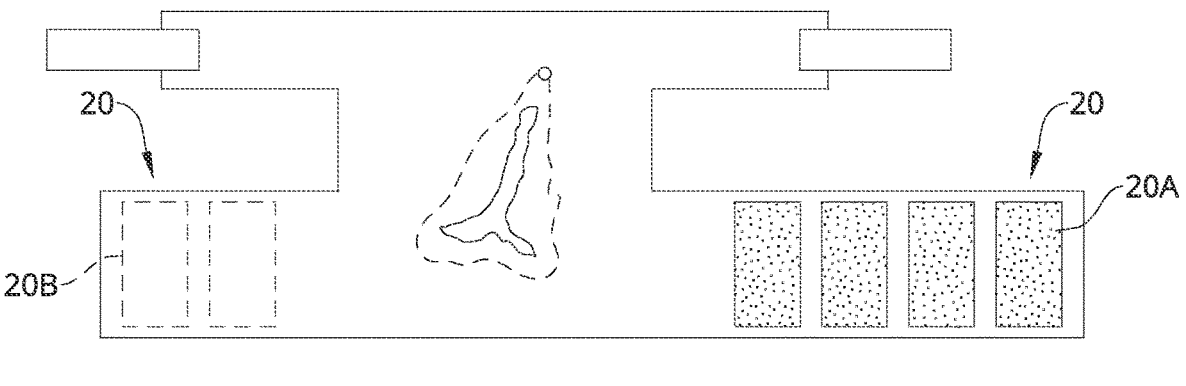
FIG. 6 is a bottom plan view of an exemplary embodiment of the present invention.
Figure 7:
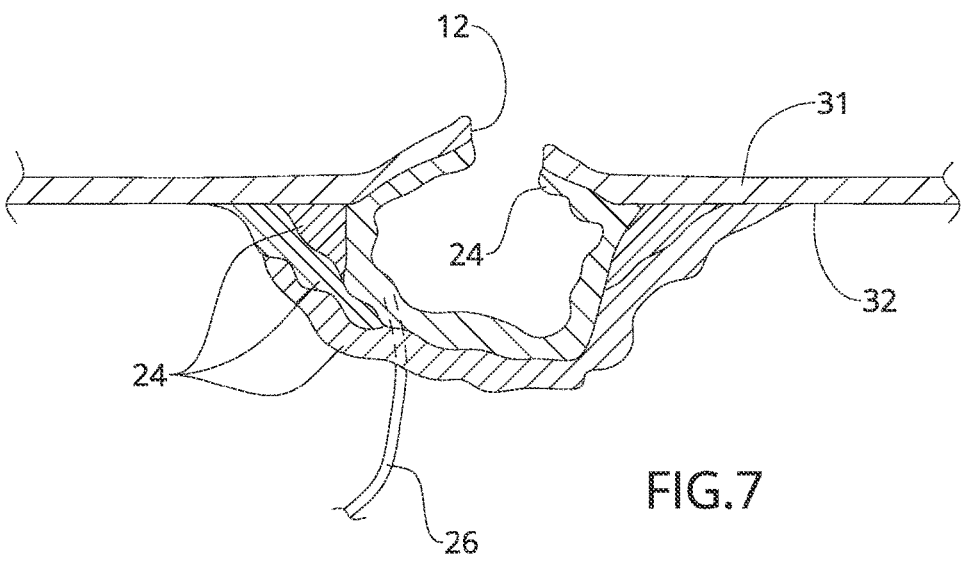
FIG. 7 is a detailed cross-sectional view of an exemplary embodiment of the present invention, taken along a simulated wound 12.
Figure 8:
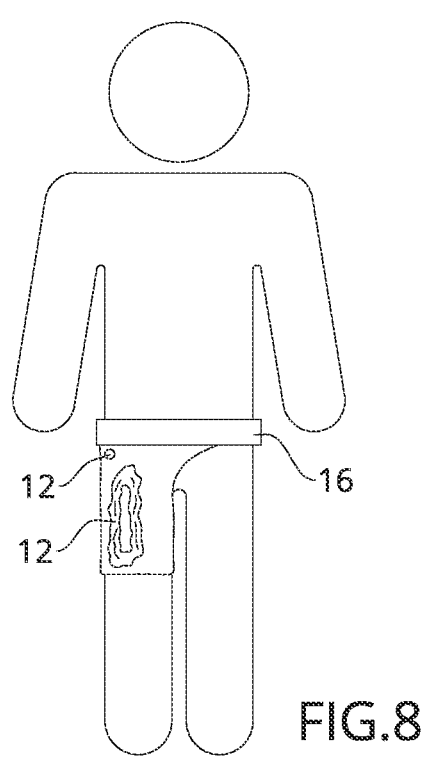
FIG. 8 is a schematic view of an exemplary embodiment of the present invention.
Figure 9:
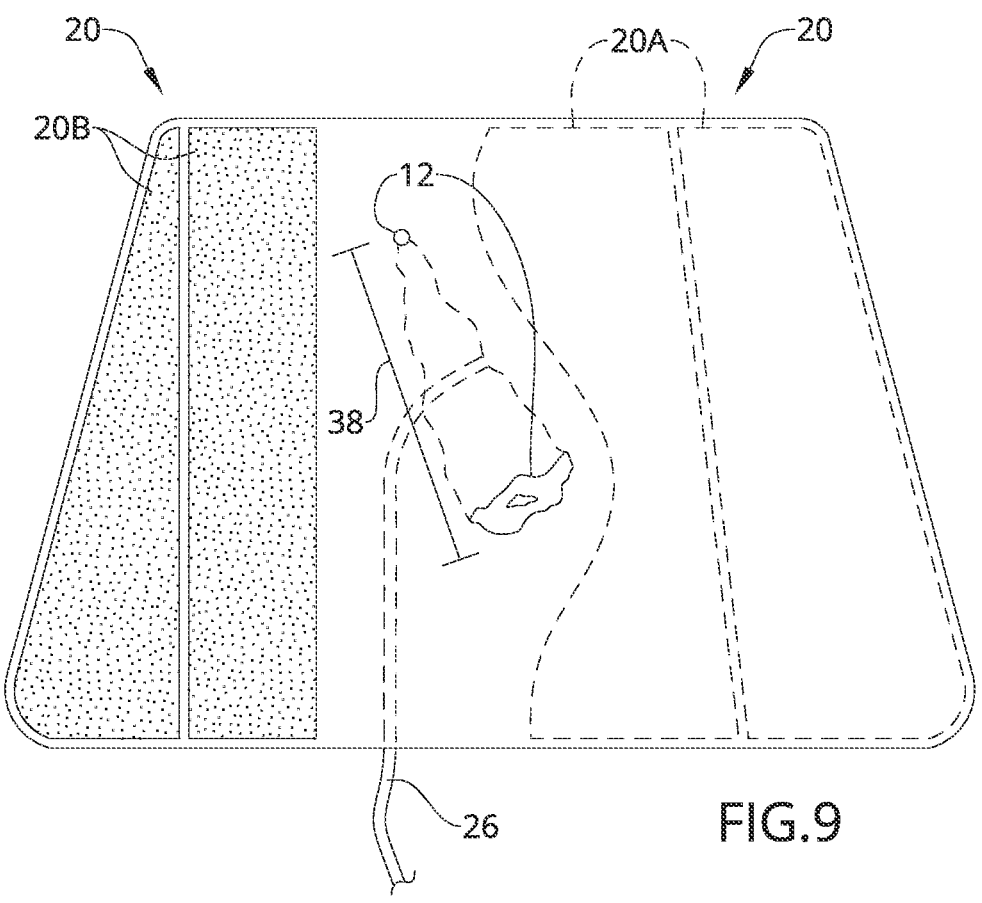
FIG. 9 is a top plan view of an exemplary embodiment of the present invention.
Figure 10:
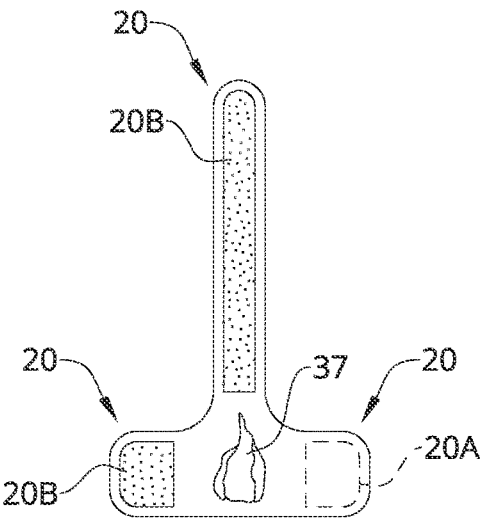
FIG. 10 is a top plan view of an exemplary embodiment of the present invention.
Figure 11:
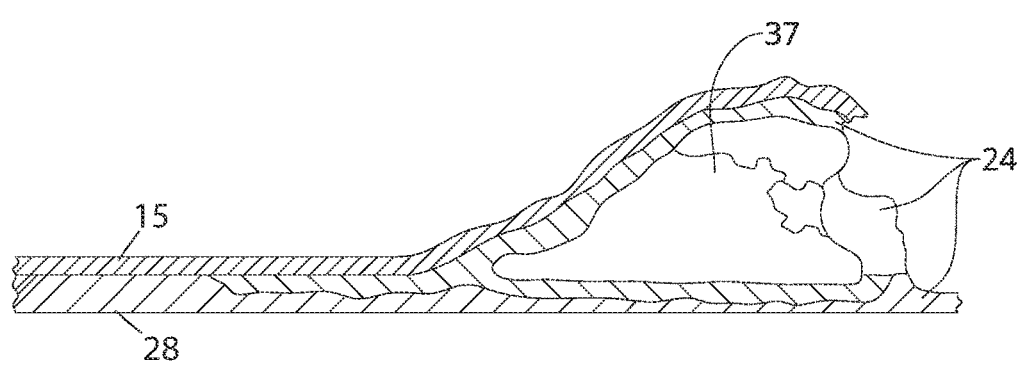
FIG. 11 is a detailed cross-sectional view of an exemplary embodiment of the present invention, taken along a simulated wound site.
Figure 12:
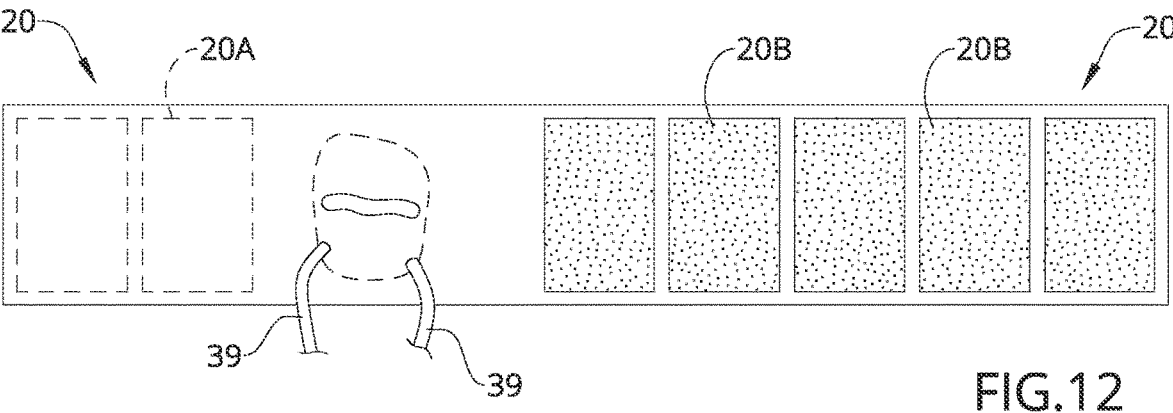
FIG. 12 is a bottom plan view of an exemplary embodiment of the present invention.
Figure 13:
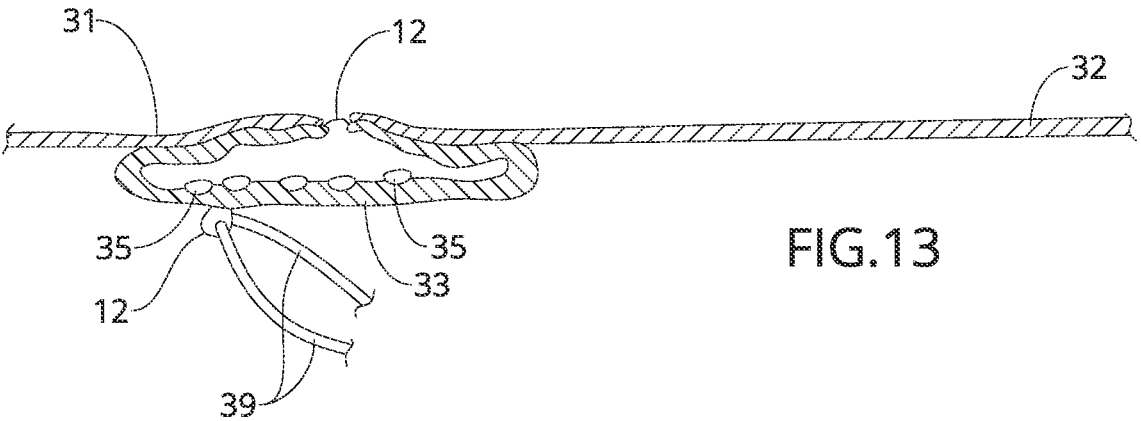
FIG. 13 is a schematic cross-sectional view of an exemplary embodiment of the present invention, illustrating relative disposition of a differential first density simulated tissue 33 and a differential third density simulated tissue 35.
Figure 14:
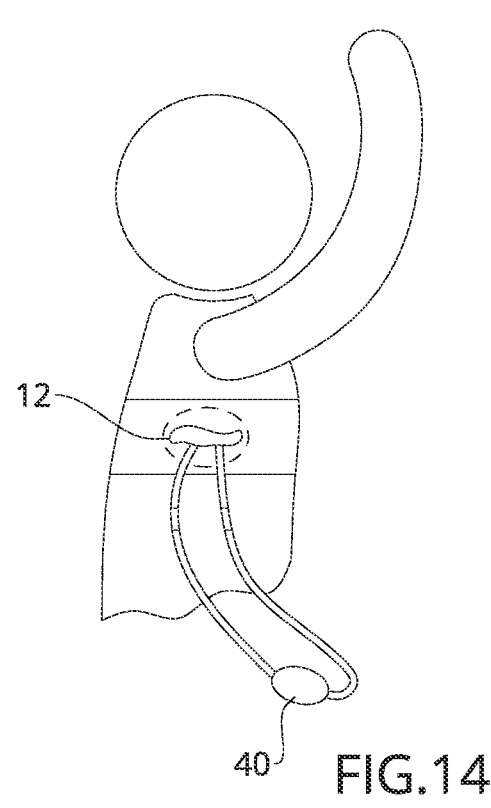
FIG. 14 is a schematic elevation view of an exemplary embodiment of the present invention, shown in use.

Referring to FIGS. 4 and 5, carrier 14 has an inward or bottom surface 28 that is fluidly coupled to the temporary cavity 25 as well as the break 27 in the simulated skin 31. As such, a delivery conduit 26A for delivering fake blood 26 may be fluidly connected to these regions 25 and 27. The fake blood 26 may be urged into these regions by way of tubing and a pump 40. The bottom surface 28 may provide a girdle system 30 proving a plurality of elastic filaments for removably attaching the wearable wound simulation 10—top surface 15 facing outward—on a user 11/role-player extremity 36.

Referring to FIGS. 6 through 14, the following, non-exhaustive list of simulated injuries can be provided through the present invention.

a. Open Compound Fractures: Extension of fractured bones through is simulated by designing a Shore A Hardness Scale ranging from 40 to 100 and a Shore D Hardness of 0 to 90 simulated bone 37 that protrudes beyond the skin layer with associated lower Shore 00 Scale 0 to 100 Hardness silicone connective tissue and muscle.

b. Sucking Chest Wound: Sucking chest wounds are simulated via the before mentioned differential of density system with a tubing system 39 that sucks and blows air through the wound open. In this case there are two levels of wound, one wound appearing at the skin level 31 and the next at the opening of the chest between or through the ribs into the simulated chest wall.

c. Laceration: Laceration ranging from ½ inch to 30 inches using the deferential of density system and separation of the skin and subcutaneous layer. Separation of tissue layers allows for application of treatments including digital manual pressure and application of packing material.

d. Degloving injuries: Degloving is the removal of the overlaying skin during injury while leaving the underlying connective tissue, ligament, tendons, and bone. These wounds are simulated via the overlay of simulated tissues using the differential of density design previously mentioned.

e. Penetrating Ballistic and Blast Wound Track:

i) The present invention is adapted to simulate a ballistic injury from entrance to exit wound. This is created by mimicking the ballistic wound track 38 which includes a temporary wound track mold that then collapses to the permanent wound track 38 when applied to the role-player under the tension of the straps and adhering devices against the role-players skin. Note, Once it is strapped to the role player, the temporary cavity collapses to a permanent cavity just as it does when a projectile enters the body.

ii) The present invention is adapted to apply to blast injury in the same fashion. Tissue is disturbed during the primary, secondary, and tertiary blast effects creating unattached tissue layers including skin, subcutaneous, tendons, ligaments, and bones. Bones may be outwardly appearing from the wound or encapsulated with the silicone layers wrapped in four-way stretch material to give the feel of bones shards rubbing against each other while avoiding dislodgement through softer silicone layers due to shear force during treatment.

iii) The present invention provides for a separation of tissues extends away from the visible wound occurs in both ballistic and blast injuries. This is simulated in this system by molds that extend far beyond the outwardly visible wound. This creates a wound that closely approximates a real wound, creates natural blood flow from the wound and facilitates standard of care wound treatments by the item end-user.

In one embodiment, a simulated wound 12 may be made from molded clay, plastics, and the like that can provide an internal appearance and internal temporary cavity 25 of penetrating objects and breaks 27 in tissue planes. From there, a manufacturer may mold the negative of the mold with resin epoxy, plaster, and/or other molding mediums, and integrate the mold negative into the full-sized mold structure. This embodiment allows for the realistic flow of blood throughout the wound and the ability to apply manual pressure and wound packing to areas of the wound that do not have active blood flow constituting an inappropriate treatment. Blood flow and pool in the layers of the compressed wound track creating an assessment challenge for the end user and facilitate outcome-based training.

Critically, the manufacturer applies silicone in a plurality of layers of variable density and/or thickness with a higher tensile strength material. The plurality of layers may, separately or in an integrated manner, provide a differential first density simulated tissue 33 ranging from 1/16 to three inches in thickness, a differential second density simulated tissue 34 ranging from 1/16 to three inches in thickness, and a differential third density simulated tissue 35 ranging from 1/16 to three inches in thickness. The manufacturer may add plastics, metals, wood, or other higher density objects into the model as well as provide coloring. Fixation devices 16, 20, 20A, 20B, 30 may be added to attachment points of the carrier 15. Finally, delivery conduits 26A for fake blood 26 may be fluidly coupled to the wound site 12.

The mold components may be adapted to conform to the desired form and function. The form is unique in that it is made for each specific wound and includes a negative of impaled objects and bones that will be added to the final product. Application of silicone, flexible, firm, and hard objects create the variable density of the wound. Fixation device includes the forms of fixation that are used to attach the simulated wound to the role-player/user 11 in a way that allows various wounds to be applied in an anatomically accurate way to a wide variety of sized role-players. It should be understood that adjacent layers of simulated tissue 33-35 adhere to the next layer through the curing process, and is done using cure compatible products.

Specifically, step one of the manufacturing processes may include molding a wound from clay and plastics with the outward appearance of a wound and the internal texture and shape of a wound, including the temporary ballistic wound track, entrance and exit wound and hollow thin layers that will function as underlined layers of tissue. Step two may include pouring a self-hardening plastic epoxy, plastic or other mold making material in a form that completely covers the wound. Step three includes removing the "negative mold" created in the step two and building a flat or curved base that can accept liquid, semi-liquid or firm silicone or other flexible materials. Step four may include applying layers of silicone or flexible and firm objects into the mold to create the anatomical model product with the appropriate colors. Step five includes removing the silicone from the mold and coloring the exterior and internal components of the wound model for the desired realistic effect. Step six includes attaching fixation devices in the form of nylon straps and clips, hook-and-loop fastener strips 20, 20A, 20B that allow maximum flexibility and expansion or a girdle system in the appropriate system to adhere the wound model to the anatomical accurate area of both large and small role-players. The manufacturer may place the delivery conduit 26A for fake blood 26 flow in and around the simulated wound 12.

The creator of the wearable wound simulation 10 may choose which adherent method of combination of adherence models are required to achieve adherence to the widest variety of role-players/users 11. Step six may be applied earlier in the model product to create a more seamless appearance. Adhesives, sewing or metal fixation may be used in Step 6.

A method of using the present invention may include the following. The wearable wound simulation 10 disclosed above may be provided. A medical trauma trainer may use the wearable wound simulation 10 to create a specific wound that can be worn by a role-payer 11 or placed over the top of a manikin to create a functional wound. The wound is applied to the anatomical correct place of the injury and either concealed with clothing or left open. The role-player or the instructor can control the flow of blood or reaction of the patient to the treatments to enable learning by the student.

While one or more preferred embodiments are disclosed, many other implementations will occur to one of ordinary skill in the art and are all within the scope of the invention. Each of the various embodiments described above may be combined with other described embodiments to provide multiple features. Furthermore, while the preceding describes several separate embodiments of the apparatus and method of the present invention, what has been described herein is merely illustrative of applying the principles of the present invention. Other arrangements, methods, modifications, and substitutions by one of ordinary skill in the art are therefore also considered within the scope of the present invention, which is not to be limited except by the claims directed to the present invention.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. A simulated wound task trainer, comprising:

a carrier;

a simulated wound disposed along a first surface of the carrier, the simulated wound comprising a skin layer with a discontinuity communicating with a cavity underneath the skin layer, wherein a cross-sectional width of the cavity is at least five times a cross-sectional width of the discontinuity; and a plurality of tissue layers defining a distal boundary of the cavity, wherein each tissue layer of the plurality has a different density.

2. The simulated wound task trainer of claim 1, wherein the plurality of tissue layers includes a first tissue layer and second tissue layer having a first Shore 00 Hardness Scale ranging from 00 to 30 and a second Shore 00 Hardness Scale ranging from 60 to 90.

3. The simulated wound task trainer of claim 2, wherein the skin layer has a Shore 00 Hardness Scale ranging from 10 to 80.

4. The simulated wound task trainer of claim 3, wherein said layers are silicone.

5. The simulated wound task trainer of claim 4, wherein the skin layer is integrated with a four-way stretch material.

6. The simulated wound task trainer of claim 5, further comprising an outlet of a conduit disposed within the cavity and fluidly connected to the discontinuity.

7. The simulated wound task trainer of claim 6, further comprising a mass of silicone having Shore D Hardness ranging from 60 to 90, wherein the mass extends from the cavity and through the discontinuity to resemble a bone.

8. The simulated wound task trainer of claim 7, further comprising a plurality of hook or loop fastener panels disposed along the first surface; and a plurality of hook or loop fastener panels disposed along a second surface, opposite the first surface.

9. The simulated wound task trainer of claim 7, further comprising a girdle connection along a second surface, opposite the first surface.

10. The simulated wound task trainer of claim 2, further comprising a third tissue layer adhered to the second tissue layer, wherein the third tissue layer is silicon having a third Shore 00 Hardness Scale ranging from 10 to 80.

11. A method of making a moulage wound site task trainer, the method comprising:
　forming a negative mold of the simulated wound of claim 1; and
　applying a plurality of silicone tissue layers defining a distal boundary of the cavity, wherein each tissue layer of the plurality has a different density.

* * * * *